(12) United States Patent
Zhang et al.

(10) Patent No.: US 11,849,060 B2
(45) Date of Patent: Dec. 19, 2023

(54) DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventors: Zhuo Zhang, Hubei (CN); Xiaoqian Ma, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 309 days.

(21) Appl. No.: 17/287,208

(22) PCT Filed: Mar. 26, 2021

(86) PCT No.: PCT/CN2021/083328
§ 371 (c)(1),
(2) Date: Apr. 21, 2021

(87) PCT Pub. No.: WO2022/193354
PCT Pub. Date: Sep. 22, 2022

(65) Prior Publication Data
US 2023/0156103 A1    May 18, 2023

(30) Foreign Application Priority Data

Mar. 18, 2021 (CN) .......................... 202110289343.4

(51) Int. Cl.
*H04M 1/00* (2006.01)
*H04M 1/02* (2006.01)

(52) U.S. Cl.
CPC ....... *H04M 1/0237* (2013.01); *H04M 1/0264* (2013.01); *H04M 1/0268* (2013.01); *H04M 2201/08* (2013.01); *H04M 2201/38* (2013.01)

(58) Field of Classification Search
CPC ......... H04M 2201/38; H04M 2201/08; H04M 1/0237; H04M 1/0264; H04M 1/0268
See application file for complete search history.

(56) References Cited

U.S. PATENT DOCUMENTS

2018/0198899 A1   7/2018   Lee
2020/0022268 A1*  1/2020   Zuo ...................... G06F 1/1681
(Continued)

FOREIGN PATENT DOCUMENTS

CN    205485747 U    8/2016
CN    108377279 A    8/2018
(Continued)

*Primary Examiner* — Nhan T Le

(57) ABSTRACT

A display device includes a housing having a display window, a flexible screen assembled in the housing and including a display area and a light-transmissive area, and an optical component disposed in the housing. The display device provides the optical component under the flexible screen and enables the flexible screen to be slidable with respect to the display window, so that the display device switches between a first state and a second state, which only protects the optical component, but also enables a full-screen display in the first state (a non-camera state).

18 Claims, 4 Drawing Sheets

(56) References Cited

U.S. PATENT DOCUMENTS

2020/0209924 A1\* 7/2020 Zuo .................... G06F 3/04883
2020/0363674 A1\* 11/2020 Chang ............... G02F 1/133308
2022/0397937 A1\* 12/2022 Sun ...................... G06F 1/1652

FOREIGN PATENT DOCUMENTS

| | | | |
|---|---|---|---|
| CN | 108769305 | A | 11/2018 |
| CN | 108881528 | A | 11/2018 |
| CN | 208386626 | U | 1/2019 |
| CN | 110035153 | A | 7/2019 |
| CN | 110166590 | A | 8/2019 |
| CN | 210093271 | U | 2/2020 |
| CN | 111385380 | A | 7/2020 |
| CN | 111739414 | A | 10/2020 |
| CN | 111758082 | A | 10/2020 |
| CN | 111866225 | A | 10/2020 |
| CN | 111970392 | A | 11/2020 |
| EP | 3742711 | A1 | 11/2020 |

\* cited by examiner

DISPLAY DEVICE

BACKGROUND OF INVENTION

1. Field of Invention

The present invention relates to a technical field of displays, and particularly to, a display device.

2. Related Art

With ever-increasing requirements for mobile phone screens, full-screen display mobile phones have become an inevitable trend. However, front cameras of mobile phones occupy screen space, causing incomplete images in areas being taken up, so a true full screen cannot be realized. Industries adopt a solution by digging slots on shells and installing cameras in the slots in such a way that the camera is liftable. When cameras are needed, the cameras protrude from the slots, and when not needed, the cameras are hidden in the slots. Such design requires the configuration of lifting components to control the lifting of the cameras. During shooting processes, the cameras are exposed and easily damaged. In addition, the existence of the slots makes mobile phone screens unable to achieve a true full-screen display. As a result, cameras of full-screen mobile phones in prior art are prone to damage and cannot achieve a true full-screen display in a non-camera state.

Accordingly, it is imperative to provide an improved display device to solve the above-mentioned technical problem.

SUMMARY OF INVENTION

An object of the present invention is to provide a display device to achieve a full-screen display in a non-camera state and protect optical components.

To achieve the above-mentioned object, the present invention provides the technical solution as follows:

The present invention provides a display device, comprising a housing comprising a display window; a flexible screen assembled in the housing and comprising a display area and a light-transmissive area defined on one end of the display area; and an optical component disposed in the housing and located on a side of the flexible screen facing away the display window; wherein the flexible screen is slidable with respect to the display window to enable switching of the display device between a first state and a second state; wherein the display area of the flexible screen is directly facing the display window, and the light-transmissive area is located outside the display window in the first state; and wherein the light-transmissive area of the flexible screen is located in the display window and directly facing the optical component in the second state.

In an alternative embodiment of the present invention, the display device further comprises a first roller and a second roller disposed in the housing and located at two ends of the display device, wherein two ends of the flexible screen are attached around the first roller and the second roller, respectively, so that the flexible screen slides around and against the first roller and the second roller.

In an alternative embodiment of the present invention, the flexible screen further comprises a first end and a second end, the first end of the flexible screen is attached around the first roller to be connected to the housing through a first connecting member, and the second end of the flexible screen is attached around the second roller to be connected to the housing through a second connecting member.

In an alternative embodiment of the present invention, the first connecting member comprises an adhesive plate fixed on the first end or the second end of the flexible screen; a gear rack fixed on the adhesive plate; and a gear meshing with the gear rack and rotatably connected to the housing; wherein the gear is configured to drive the gear rack to slide, and the gear rack is configured to drive the flexible screen to slide with respect to the display window.

In an alternative embodiment of the present invention, the gear rack has a length equal to a sliding distance that the flexible screen slides between the first state and the second state of the display device.

In an alternative embodiment of the present invention, the first connecting member and the second connecting member comprise a first magnetic element fixed to the first end or the second end of the flexible screen; a second magnetic element disposed on the housing facing away the display window and being magnetically opposite to the first magnetic element; and a third magnetic element disposed on the housing facing away the display window and being magnetically opposite to the first magnetic element; wherein the first magnetic element attracts the second magnetic element in the first state, and the first magnetic element attracts the third magnetic element in the second state.

In an alternative embodiment of the present invention, the second magnetic element is spaced apart from the third magnetic element at a spacing equal to a sliding distance that the flexible screen slides between the first state and the second state of the display device.

In an alternative embodiment of the present invention, the display device further comprises a driving element connected to the firsts connecting member and the second connecting member and configured to drive the flexible screen to slide with respect to the display window.

In an alternative embodiment of the present invention, the display device further comprises a distance sensing element disposed in the housing and configured to sense a sliding distance that the flexible screen slides with respect to the display window; and a control element disposed in the housing and configured to control whether the driving element stops driving the flexible screen according to the sliding distance being sensed.

In an alternative embodiment of the present invention, the first end and the second end of the flexible screen are curvingly attached to the first roller and the second roller, respectively, and are wound inwardly or stretched out on the first roller and the second roller, respectively, along with the sliding of the flexible screen with respect to the display window.

In an alternative embodiment of the present invention, the first connecting member and the second connecting member are slidably connected to the housing and are driven simultaneously.

In an alternative embodiment of the present invention, the first connecting member is slidably connected to the housing, and the second connecting member is fixedly connected to the housing.

In an alternative embodiment of the present invention, at least a through hole passing through the flexible screen is defined in the light-transmissive area.

In an alternative embodiment of the present invention, the display device further comprises a cover assembled above the display window of the housing and the flexible screen, wherein the flexible screen is slidable with respect to the cover.

In an alternative embodiment of the present invention, a lubricant is filled between the flexible screen and the cover.

In an alternative embodiment of the present invention, the lubricant is an optically clear adhesive.

In an alternative embodiment of the present invention, the display device further comprises a control device for enabling an automatic switching of the flexible device between the first state and the second state.

In an alternative embodiment of the present invention, the housing is provided with a slidable button fixedly connected to the first connecting member and the second connecting member and configured to be pushed, so that the flexible screen is slidable with respect to the display window.

In an alternative embodiment of the present invention, the display device is in a full-screen display state in the first state.

In an alternative embodiment of the present invention, the second connecting member is a screen tensioning assembly, and the screen tensioning assembly applies a pre-tensioning force to the flexible screen.

The present invention has advantageous effects as follows: a display device provided by the present invention is to provide the optical component under a flexible screen and enable the flexible screen to be slidable with respect to a display window of a housing, thereby not only protecting the optical component from being damaged, but also enabling a full-screen display in a non-camera state.

In addition, a light-transmissive area of the display device provided by the present invention is hidden behind the first roller or located directly facing the display window under the flexible screen, not exposed to the outside, so that the display device provided by the present invention has a better appearance; the display device provided by the present invention utilizes a gear rack and a gear, three magnetic elements, a distance sensing element, and a control element to control a moving distance of the flexible screen, thereby enabling a switching accuracy of the display device between the first state and the second state; and a gap between the flexible screen and a cover is filled with a transparent lubricant, which can reduce the wear of the flexible screen during rolling.

BRIEF DESCRIPTION OF DRAWINGS

To better illustrate embodiments or technical solutions in the prior art, a brief description of the drawings used in the embodiments or the prior art description will be given below. Obviously, the accompanying drawings in the following description merely show some embodiments of the present invention, and a person skilled in the art may still derive other drawings from these accompanying drawings without creative efforts.

DESCRIPTION OF PREFERRED EMBODIMENTS

Figure 1:
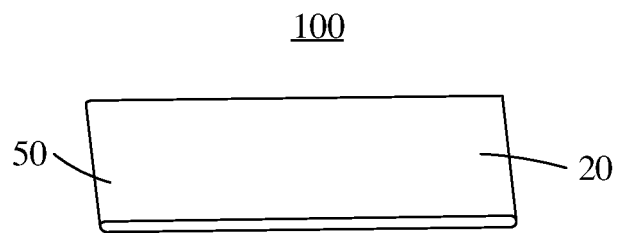
FIG. 1 is a schematic perspective view of a display device (in a first state) provided by the present invention.

The technical solutions in the embodiments of the present application will be clearly and completely described in the following with reference to the accompanying drawings in the embodiments. Apparently, the embodiments as described are only a part, but not all, of the embodiments of the present application. Based on the embodiments in the present application, all other embodiments obtained by those skilled in the art without creative efforts shall be within the scope of the present application.

In the description of the present invention, it should be understood that the orientation or positional relationship indicated by the terms "upper", "lower", etc. are based on the orientation or positional relationship shown in the drawings, and are only for the convenience of describing the present invention and simplifying the description. They do not indicate or imply that the pointed device or element must have a specific orientation, be configured and operated in a specific orientation, and therefore cannot be understood as a limitation of the present invention. Moreover, the terms "first" and "second" and the like are used for descriptive purposes only and are not to be construed as indicating or implying relative importance. Thus, features defining "first" or "second" may include one or more of the described features either explicitly or implicitly. In the description of the present invention, the meaning of "a plurality" is two or more unless specifically and specifically defined otherwise.

The present disclosure may repeat reference numerals in different embodiments and/or the reference letters. This repetition is for the purpose of simplicity and clarity, and does not indicate a relationship between the various embodiments and/or set in question.

In regard to a technical problem that current full-screen mobile phones have optical components that are easily damaged and cannot achieve a true full-screen display in a non-camera state, the present invention is to provide a camera device under a flexible screen and to enable the flexible screen to be slidable, thereby realizing switching of a display device between a first state and a second state, which not only protects the optical components from being harmed but also enables a full-screen display in a non-camera state.

A display device of the present invention will be described in detail below in conjunction with specific embodiments.

Please refer to FIGS. 1 to 4. The present invention provides a display device 100, which may be a mobile phone, a display screen, a notebook, etc. with a camera function. In the present invention, the display device 100 is a mobile phone.

The display device 100 operates in a first state and a second state. Specifically, in an alternative embodiment of the present invention, the first state is a non-camera state (full-screen display state), and the second state is a camera state.

Figure 2:
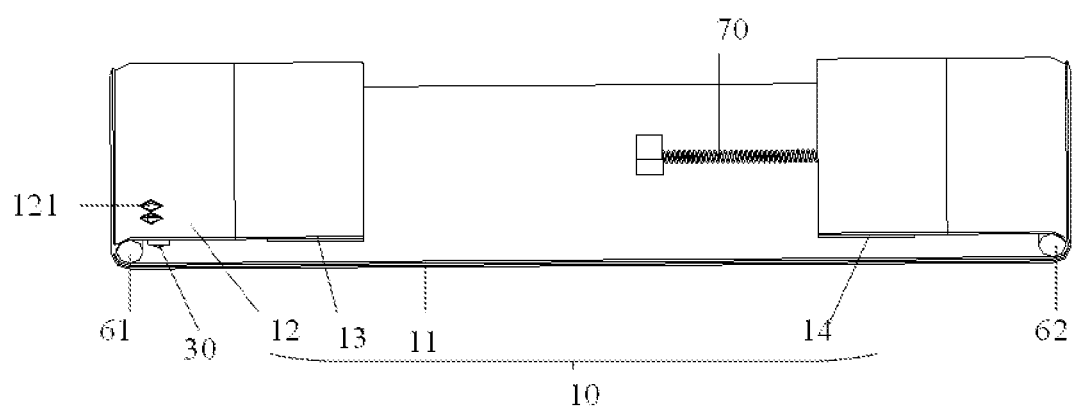
FIG. 2 is a schematic perspective view of a display device without a housing in a first display state.
Figure 3:
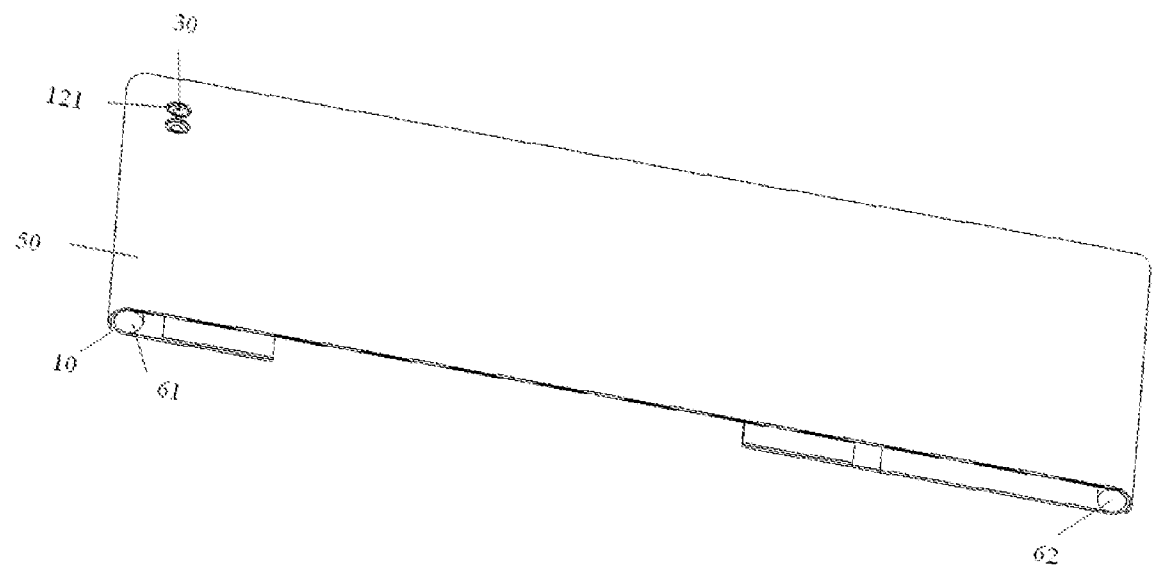
FIG. 3 is a schematic perspective view of a display device without a housing in a second display state.

Specifically, please refer to FIGS. 1-3. The display device 100 includes a housing 20, a flexible screen 10, and an optical component 30. The housing 20 includes a display window (not shown). The flexible screen 10 is assembled in the housing 20. The flexible screen 10 includes a display area 11 and a light-transmissive area 12 defined on one end of the display area 11. The optical component 30 is disposed in the housing 20 and located on a side of the flexible screen 10 facing away the display window. The flexible screen 10 is slidable with respect to the display window to enable switching of the display device 100 between the first state and the second state.

Specifically, in the first state the display area 11 of the flexible screen 10 is directly facing the display window, and the light-transmissive area 12 is located outside the display window. At this time, the display panel 100 can achieve the full-screen display. In the second state the light-transmissive area 12 of the flexible screen 10 is located within the display window and directly facing the optical component 30, so that the display device 100 is not allowed for the full-screen display.

In an alternative embodiment of the present invention, a light transmittance of film layers of the flexible screen 10 located in the light-transmissive area 12 is greater than a light transmittance of film layers at other positions.

In an alternative embodiment of the present invention, at least a through hole 121 is defined in the light-transmissive area 12 to pass through the flexible screen 10. Specifically, the through hole 121 is hidden by the flexible screen 10 and faces the display window in the first state. The light-transmissive area 12 (through hole 121) is located within the display window and directly facing the optical component 30 in the second state.

Specifically, the through hole 121 may be a single hole, a dual-hole, a multi-hole, etc., or a special-shaped hole, and the special-shaped hole may be a drop shape or a rectangular shape, etc.

In an alternative embodiment of the present invention, the flexible screen 10 further includes a non-display area (not shown) located at both ends of the display area 11, and the light-transmissive area 12 is located in the non-display area or in the display area 11.

In another embodiment, the flexible screen 10 may also be configured without the non-display area. In this case, the entire flexible screen 10 is capable of displaying and can realize the full-screen display on a front and four sides. Specifically, the flexible screen 10 further includes a first end 13 and a second end 14, and the first end 13 and the second end 14 face away from each other. In an alternative embodiment of the present invention, the light-transmissive area 12 is defined between the display area 11 and the first end 13. Certainly, in another embodiment, the light-transmissive area 12 may also be defined between the display area 11 and the second end 14.

In an alternative embodiment of the present invention, the optical component 30 is a camera device. The optical component 30 is used to cooperate with the light-transmissive area 12 to capture an image. The optical component 30 is installed on the housing 20 and hidden under the flexible screen 10. In the present application, when the display device 100 is switched between the first state and the second state, the optical assembly 30 does not need to move.

In an alternative embodiment of the present invention, the display device 100 further includes a first roller 61 and a second roller 62. The first roller 61 and the second roller 62 are disposed in the housing 20 and located at two ends of the display device 100. Both ends of the flexible screen 10 are attached around the first roller 61 and the second roller 62, respectively, so that the flexible screen 10 slides around and against the first roller 61 and the second roller 62. Specifically, the first end 13 and the second end 14 of the flexible screen 10 are parallel with the flexible screen 10 facing the display window.

Specifically, the flexible screen 10 is rollable around the first roller 61 and the second roller 62 at a predetermined angle. When the flexible screen 10 rolls around the first roller 61 and the second roller 62 in a clockwise direction at the predetermined angle, the display device 100 switches from the first state to the second state. When the flexible screen 10 rolls around the first roller 61 and the second roller 62 in a counterclockwise direction at the predetermined angle, the display device 100 switches from the second state to the first state.

In an alternative embodiment of the present invention, a distance between outermost edges of the first roller 61 and the second roller 62 is equal to a length of the display window of the housing 20.

In an alternative embodiment of the present invention, a distance between centers of the first roller 61 and the second roller 62 in cross-section is equal to a length of the display window of the housing 20.

In an alternative embodiment of the present invention, the first end 13 and the second end 14 of the flexible screen 10 are curvingly attached to the first roller 61 and the second roller 62, respectively. When the first roller 61 and the second roller 62 simultaneously rotate, the flexible screen 10 is driven to slide with respect to the display window. Specifically, when the first roller 61 and the second roller 62 counterclockwise rotate, the flexible screen 10 slides in a counterclockwise direction, so the display device 100 switches from the second state to the first state.

In an alternative embodiment of the present invention, the first end 13 and the second end 14 of the flexible screen 10 are bent in a radial direction with respect to the first roller 61 and the second roller 62. The first end 13 and the second end 14 of the flexible screen 10 after being bent in the radial direction with respect to the first roller 61 and the second roller 62 are opposite to each other. Specifically, when the display device 100 switches from the first state to the second state, each of the first end 13 and the second end 14 of the flexible screen 10 moves in a direction toward the first roller 61. when the display device 100 switches from the second state to the first state, each of the first end 13 and the second end 14 of the flexible screen 10 moves in a direction away from the first roller 61.

The display device 100 further includes a first connecting member 40 and a second connecting member (not shown). One end of the first connecting member 40 is connected to the first end 13 of the flexible screen 10, and the second connecting member is fixedly or slidably connected to the housing 20.

Figure 4:
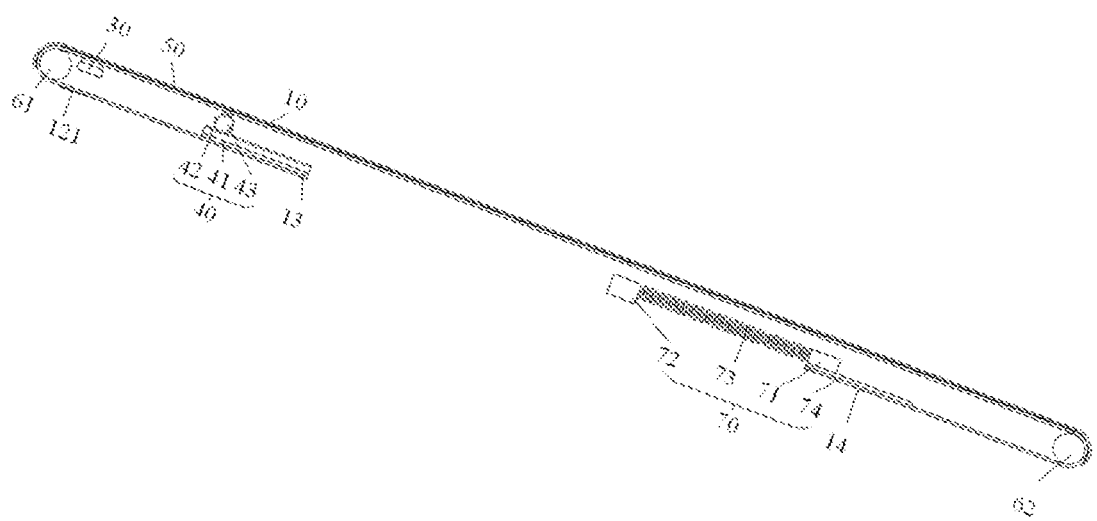
FIG. 4 is a schematic view showing internal components of a display device in the first display state.

Please refer to FIG. 4, in an alternative embodiment of the present invention, the first connecting member 40 includes an adhesive plate 41, a gear rack 42, and a gear 43. The adhesive plate 41 is fixed on the first end 13 of the flexible screen 10. The gear rack 42 is fixed on the adhesive plate 41. The gear 43 meshes with the gear rack 42 and is rotatably connected to the housing 20. The gear 43 rotates under an action of an external force to drive the gear rack 42 to slide, and the gear rack 42 drives the flexible screen 10 to slide relative to the display window.

The gear rack 42 has a length equal to a sliding distance that the flexible screen 10 slides between the first state and the second state of the display device, so that a travelling distance of the flexible screen 10 is limited.

Specifically, when the gear 43 rotates clockwise, the gear rack 42 slides in a direction toward the first roller 61. When the gear 43 rotates counterclockwise, the gear rack 42 slides in a direction away from the first roller 61.

Please refer to FIG. 4, as the display device 100 is in the first state, one end of the gear rack 42 away from the second end 14 of the flexible screen 10 meshes with the gear 43.

Figure 5:
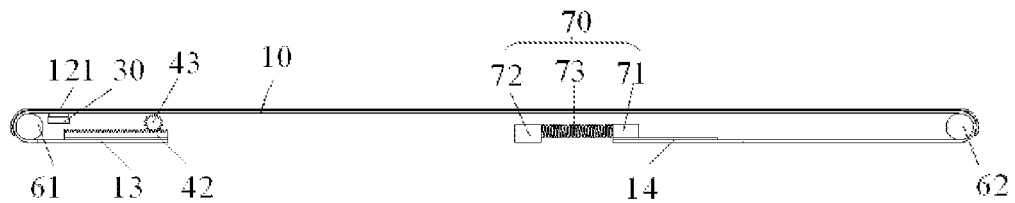
FIG. 5 is a schematic view showing internal components of a display device in the second display state.

Please refer to FIG. 5, as the display device 100 is in the second state, one end of the gear rack 42 close to the second end 14 of the flexible screen 10 meshes with the gear 43.

In an alternative embodiment of the present invention, the first connecting member and the second connecting member include a first magnetic element, a second magnetic element, and a third magnetic element (not shown). The first magnetic element is fixed to the first end 13 of the flexible screen 10. Each of the second magnetic element and the third magnetic element is disposed on the housing 20 and facing away the display window and is magnetically opposite to the first magnetic element. Specifically, compared to the second magnetic element, the third magnetic element is located closer to the first roller 61.

As the display device 100 is in the first state, the first magnetic element attracts the second magnetic element. As the display device 100 is in the second state, the first magnetic element attracts the third magnetic element.

Specifically, the second magnetic element is spaced apart from the third magnetic element at a spacing equal to a sliding distance that the flexible screen 10 slides between the first state and the second state of the display device 100.

In an alternative embodiment of the present invention, the display device 100 further includes a distance sensing element and a control element (not shown). The distance sensing element is disposed in the housing 20 and is configured to sense a sliding distance that the flexible screen 10 slides with respect to the display window. The control element is disposed in the housing 20 and is configured to control whether to stop the flexible screen sliding according to the sliding distance being sensed.

In an alternative embodiment of the present invention, the display device 100 further includes a driving element (not shown). The driving element is connected to the firsts connecting member 40 and is configured to drive the flexible screen 10 to slide with respect to the display window. Specifically, the driving element is disposed in the housing 20.

In an alternative embodiment of the present invention, film materials of any layer or splicing part of the flexible screen 10 are elastic. The first connecting member 40 is slidably connected to the housing 20, and the second connecting member is fixedly connected to the housing 20. When the first connecting member 40 is driven, the film materials of any layer or splicing part of the flexible screen 10 are stretched, so that the display device 100 can switch from the first state to the second state.

In an alternative embodiment of the present invention, the first connecting member 40 and the second connecting member are slidably connected to the housing 20. The first connecting member 40 and the second connecting member are simultaneously driven to drive the flexible screen 10 to slide with respect the display window.

Specifically, the display device 100 further includes a cover 50. The cover 50 is assembled above the display window of the housing 20 and the flexible screen 10, wherein the flexible screen 10 is slidable with respect to the cover 50. The flexible screen 10, the optical component 30, the first connecting member 40, the driving member, the first roller 61, and the second roller 62 are all arranged between the cover 50 and the housing 20, thereby improving waterproof performance of the display device 100 and prolonging service life of the display device 100.

Specifically, the cover 50 is a glass cover 50.

In an alternative embodiment of the present invention, a gap is formed between the flexible screen 10 and the cover 50. The gap is filled with a lubricant, which can reduce friction between the flexible screen 10 and the cover 50, thereby reducing wear of the flexible screen 10.

The lubricant may be a fluid or a film layer in form. When the lubricant is a film layer lubricant, the lubricant is provided on a surface of the cover 50 facing the flexible screen 10, or provided on a surface of the flexible screen 10 facing the cover 50. When the lubricant is a fluid lubricant, the lubricant is directly filled in the gap between the flexible screen 10 and the cover 50.

Specifically, the lubricant is transparent.

In an alternative embodiment of the present invention, the lubricant may have heat dissipation characteristics to facilitate heat dissipation of the display device 100.

Preferably, the lubricant is an optically clear adhesive (OCA).

Please refer to FIGS. 4-7, in an alternative embodiment of the present invention, the second connecting member is a screen tensioning assembly 70 installed in the housing 20. The screen tensioning assembly 70 applies a pre-tensioning force to the flexible screen 10. The screen tensioning assembly 70 can tension the flexible screen 10 at all times, so as to keep the flexible screen 10 flat.

Specifically, the screen tensioning assembly 70 is connected to the second end 14 of the flexible screen 10.

In an alternative embodiment of the present invention, the flexible screen 10 has elasticity. Since the first end 13 of the flexible screen 10 is fixed to the housing 20, when the screen tensioning assembly 70 slides in a direction toward the first roller 61 on the housing 20, film materials of any layer or splicing part of the flexible screen 10 are stretched, so that the display device 100 can switch from the first state to the second state. When the screen tensioning assembly 70 returns to its initial position, the flexible screen 10 restores an original state.

In an alternative embodiment of the present invention, one end of the screen tensioning assembly 70 is fixedly connected to the housing 20, the other end is fixedly connected to the second end 14 of the flexible screen 10. The screen tensioning assembly 70 and one end of the screen tension assembly 70 opposite to another end fixed to the second end 14 of the flexible screen 10 have elasticity, so as to drive the second end 14 of the flexible screen 10 to move in a direction toward or away from the first roller 61.

In an alternative embodiment of the present invention, the first end 13 of the flexible screen 13 and the entire screen tensioning assembly 70 are slidably connected to the housing 20, so that the entire screen tensioning assembly 70 slides in conjunction with sliding of the flexible screen 10. When the display device 100 switches between the first state to the second state, the pre-tensioning force remains unchanged. Specifically, the entire screen tensioning assembly 70 can slide synchronously with the first connecting member 40.

Specifically, please refer to FIGS. 4-7. The screen tensioning assembly 70 includes a first fixing end 71, a second fixing end 72, and a tensioning portion 73. The first fixing end 71 is connected to the second end 14 of the flexible screen 10. The second fixing end 72 is disposed on the housing 20. The tensioning portion 73 is connected between the first end 71 and the second end 72, and is configured to produce a pre-tensioning force.

In an alternative embodiment of the present invention, the second end 72 is fixed to the housing 20, and the first fixing end 71 slides in conjunction with sliding of the flexible screen 10. When the display device 100 switches between the first state to the second state, the pre-tensioning force changes with the sliding of the flexible screen 10.

In an alternative embodiment of the present invention, each of the second fixing end 72 and the first fixing end 71 can slide with respect to the housing 20. When the entire screen tensioning assembly 70 slides synchronously with the first connecting member 40, the pre-tensioning force remains unchanged.

Please refer to FIGS. 4-5. In an alternative embodiment of the present invention, the tensioning portion 73 is a spring. When the display device 100 switches between the first state and the second state, the spring is always in tension. Specifically, when the display device 100 switches from the first state to the second state, an amount of deformation of the spring gradually decreases, and the pre-tensioning force decreases. When the display device 100 switches from the second state to the first state, an amount of deformation of the spring gradually increases, as well as the pre-tensioning force.

Figure 6:
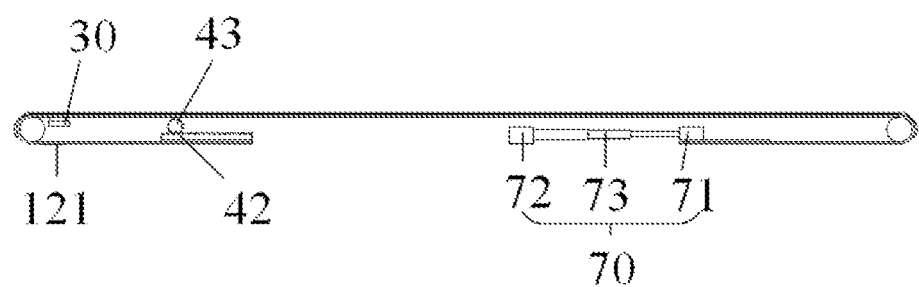
FIG. 6 is a schematic view showing internal components of a display device in the first display state provided by another embodiment of the present invention.
Figure 7:
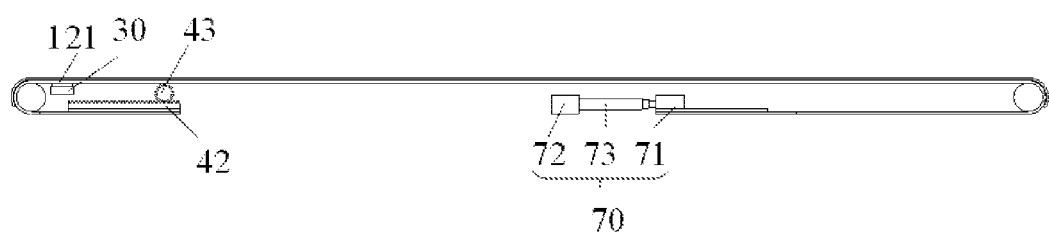
FIG. 7 is a schematic view showing internal components of a display device in the second display state provided by another embodiment of the present invention.

Please refer to FIGS. 6-7. In an alternative embodiment of the present invention, the tensioning portion 73 is a telescopic rod. The telescopic rod always has a pulling force (pre-tensioning force) on the second end 14 of the flexible screen 10. Specifically, when the display device 100 switches from the first state to the second state, the telescopic rod gradually contracts. When the display device 100 switches from the second state to the first state, the telescopic rod gradually extends.

In an alternative embodiment of the present invention, the tensioning portion 73 may also be a rigid connecting rod, as long as it is ensured that the tensioning portion 73 always tightens the flexible screen 10. In this manner, the screen tensioning assembly 70 needs to be driven synchronously with the first connecting member 40 to slide relative to the housing 20.

In an alternative embodiment of the present invention, when the first connecting member 40 and the screen tensioning assembly 70 are driven synchronously by two driving elements, the screen tensioning assembly 70 can also control a moving distance of the flexible screen 10 driven by the screen tensioning assembly 70 through the gear 43 and the gear rack 42 as described above.

In an alternative embodiment of the present invention, when the first connecting member 40 and the screen tensioning assembly 70 are driven synchronously by the two driving elements, the screen tensioning assembly 70 can also control a moving distance of the flexible screen 10 through the first magnetic element, the second magnetic element, and the third magnetic element as described above.

In an alternative embodiment of the present invention, when the first connecting member 40 and the screen tensioning assembly 70 are driven synchronously by the two driving elements, the screen tensioning assembly 70 can also control a moving distance of the flexible screen 10 through the distance sensing element and the control element as described above.

In an alternative embodiment of the present invention, the display device further includes a control device (not shown). The control device is configured to enable an automatic switching of the flexible device 100 between the first state and the second state. When a user turns on a camera, the control device automatically controls the driving element to drive the flexible screen 10 to slide clockwise to where the light-transmissive area 12 directly faces the optical component 30. When a user turns off the camera, the control device automatically controls the driving element to drive the flexible screen 10 to slide counterclockwise to where the light-transmissive area 12 is hidden behind the first roller 61 or located under and directly facing the display window of the flexible screen 10, so that the display device 100 achieves the full-screen display.

In an alternative embodiment of the present invention, the housing 20 is further provided with a slidable button (not shown). The slidable button is fixedly connected to the first connecting member 40 and is configured to be pushed, so that the flexible screen 10 is slidable with respect to the display window.

The present invention has advantageous effects as follows: 1) a display device provided by the present invention is to provide the optical component under a flexible screen and enable the flexible screen to be slidable with respect to a display window of a housing, thereby not only protecting the optical component from being damaged, but also enabling a full-screen display in a non-camera state; 2) a light-transmissive area of the display device provided by the present invention is hidden behind the first roller or located directly facing the display window under the flexible screen, not exposed to the outside, so that the display device provided by the present invention has a better appearance; 3) the display device provided by the present invention utilizes a gear rack and a gear, three magnetic elements, a distance sensing element, and a control element to control a moving distance of the flexible screen, thereby enabling a switching accuracy of the display device between the first state and the second state; 4) A gap between the flexible screen and a cover is filled with a transparent lubricant, which can reduce the wear of the flexible screen during rolling; 5) in the present application, the display device can switch between the first state and the second state just by enabling the flexible screen to slide relative to the housing while the optical component remains stationary. Compared with display devices that need to use camera lifting assembly to realize the switching of working states in the related art, the structure of the present invention is simpler, and the optical component is not likely to be damaged.

Accordingly, although the present invention has been disclosed as a preferred embodiment, it is not intended to limit the present invention. Those skilled in the art without departing from the scope of the present invention may make various changes or modifications, and thus the scope of the present invention should be after the appended claims and their equivalents.

What is claimed is:

1. A display device, comprising:
   a housing comprising a display window;
   a flexible screen assembled in the housing and comprising a display area and a light-transmissive area defined on one end of the display area; and
   an optical component disposed in the housing and located on a side of the flexible screen facing away the display window;
   wherein the flexible screen is slidable with respect to the display window to enable switching of the display device between a first state and a second state;
   wherein the display area of the flexible screen is directly facing the display window, and the light-transmissive area is located outside the display window in the first state; and
   wherein the light-transmissive area of the flexible screen is located in the display window and directly facing the optical component in the second state;
   wherein the display device further comprises a first roller and a second roller disposed in the housing and located at two ends of the display device, wherein two ends of the flexible screen are attached around the first roller and the second roller, respectively, so that the flexible screen slides around and against the first roller and the second roller;

wherein the flexible screen further comprises a first end and a second end, the first end of the flexible screen is attached around the first roller to be connected to the housing through a first connecting member, and the second end of the flexible screen is attached around the second roller to be connected to the housing through a second connecting member.

2. The display device of claim 1, wherein the first connecting member comprises:
an adhesive plate fixed on the first end or the second end of the flexible screen;
a gear rack fixed on the adhesive plate; and
a gear meshing with the gear rack and rotatably connected to the housing;
wherein the gear is configured to drive the gear rack to slide, and the gear rack is configured to drive the flexible screen to slide with respect to the display window.

3. The display device of claim 2, wherein the gear rack has a length equal to a sliding distance that the flexible screen slides between the first state and the second state of the display device.

4. The display device of claim 1, wherein the first connecting member and the second connecting member comprise:
a first magnetic element fixed to the first end or the second end of the flexible screen;
a second magnetic element disposed on the housing facing away the display window and being magnetically opposite to the first magnetic element; and
a third magnetic element disposed on the housing facing away the display window and being magnetically opposite to the first magnetic element;
wherein the first magnetic element attracts the second magnetic element in the first state, and the first magnetic element attracts the third magnetic element in the second state.

5. The display device of claim 4, wherein the second magnetic element is spaced apart from the third magnetic element at a spacing equal to a sliding distance that the flexible screen slides between the first state and the second state of the display device.

6. The display device of claim 1, further comprising a driving element connected to the firsts connecting member and the second connecting member and configured to drive the flexible screen to slide with respect to the display window.

7. The display device of claim 6, further comprising:
a distance sensing element disposed in the housing and configured to sense a sliding distance that the flexible screen slides with respect to the display window; and
a control element disposed in the housing and configured to control whether the driving element stops driving the flexible screen according to the sliding distance being sensed.

8. The display device of claim 1, wherein the first end and the second end of the flexible screen are curvingly attached to the first roller and the second roller, respectively, and are wound inwardly or stretched out on the first roller and the second roller, respectively, along with the sliding of the flexible screen with respect to the display window.

9. The display device of claim 1, wherein the first connecting member and the second connecting member are slidably connected to the housing and are driven simultaneously.

10. The display device of claim 1, wherein the first connecting member is slidably connected to the housing, and the second connecting member is fixedly connected to the housing.

11. The display device of claim 1, wherein at least a through hole passing through the flexible screen is defined in the light-transmissive area.

12. The display device of claim 1, further comprising a cover assembled above the display window of the housing and the flexible screen, wherein the flexible screen is slidable with respect to the cover.

13. The display device of claim 12, wherein a lubricant is filled between the flexible screen and the cover.

14. The display device of claim 13, wherein the lubricant is an optically clear adhesive.

15. The display device of claim 1, further comprising a control device for enabling an automatic switching of the flexible device between the first state and the second state.

16. The display device of claim 1, wherein the housing is provided with a slidable button fixedly connected to the first connecting member and the second connecting member and configured to be pushed, so that the flexible screen is slidable with respect to the display window.

17. The display device of claim 1, wherein the display device is in a full-screen display state in the first state.

18. The display device of claim 1, wherein the second connecting member is a screen tensioning assembly, and the screen tensioning assembly applies a pre-tensioning force to the flexible screen.

* * * * *